Aug. 17, 1954     E. GERBER ET AL     2,686,556
MACHINE FOR SEALING THERMOPLASTIC MATERIALS
Filed May 31, 1950     3 Sheets-Sheet 1
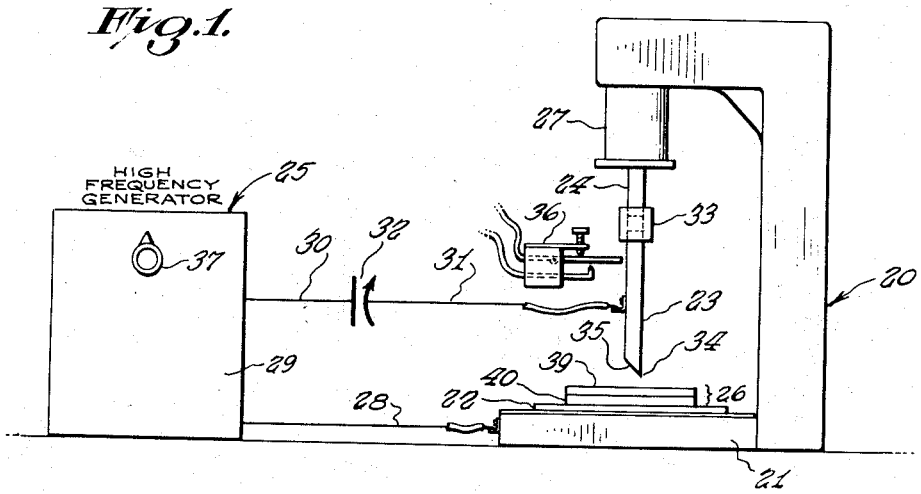
Fig.1.
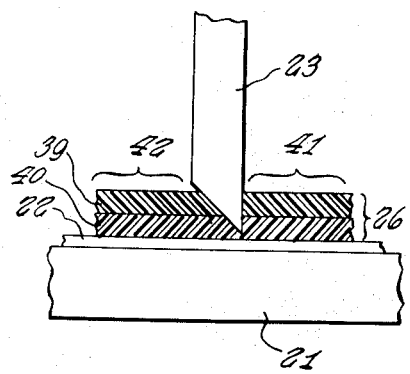
Fig.2
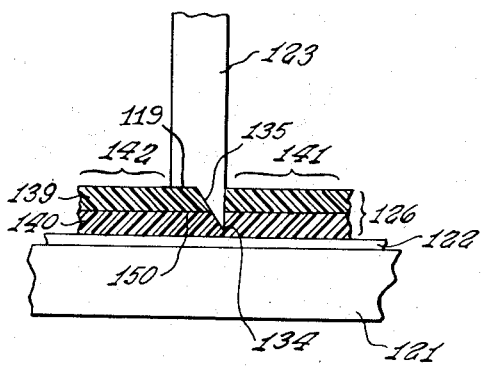
Fig.3
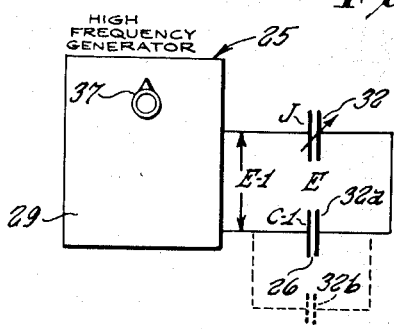
Fig.4
Fig.4a
INVENTORS
Eugene Gerber
Sol Zaretsky Aug. 17, 1954     E. GERBER ET AL     2,686,556
MACHINE FOR SEALING THERMOPLASTIC MATERIALS
Filed May 31, 1950     3 Sheets-Sheet 2
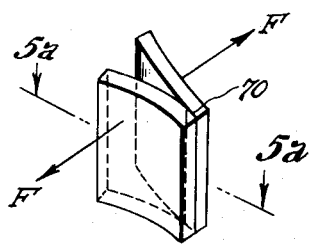
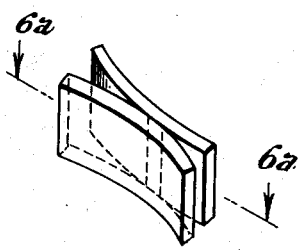
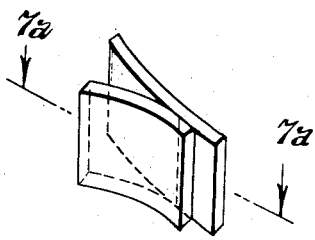
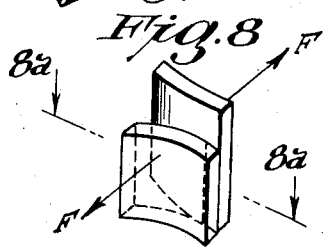
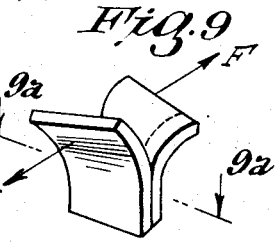
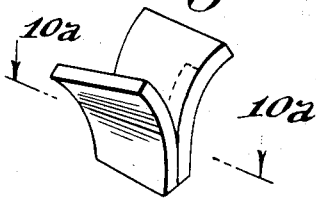
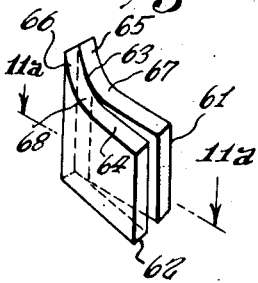
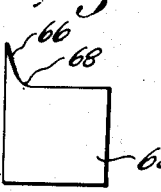
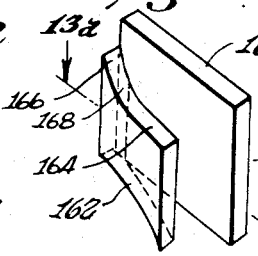
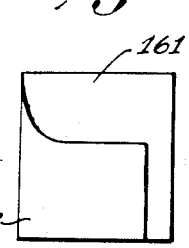
INVENTORS
Eugene Gerber
Sol Zaretsky

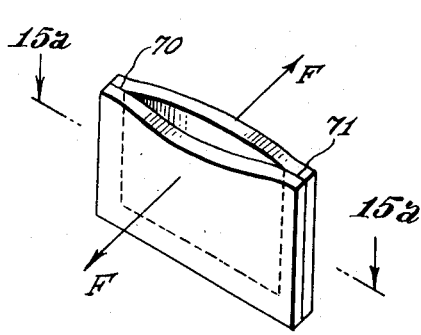
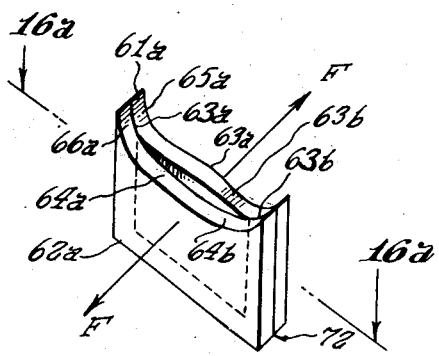
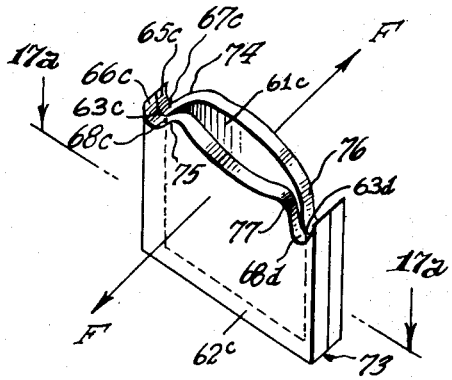
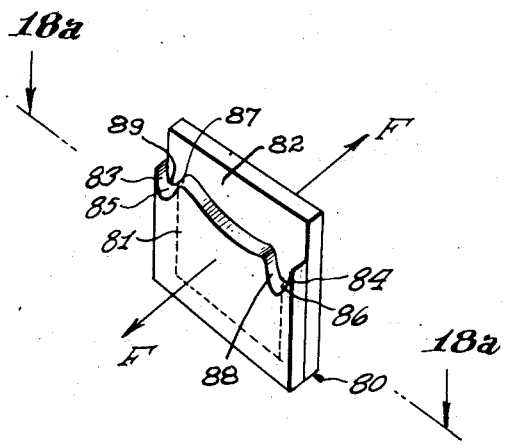

Patented Aug. 17, 1954

2,686,556

UNITED STATES PATENT OFFICE 2,686,556

MACHINE FOR SEALING THERMOPLASTIC MATERIALS

Eugene Gerber and Sol Zaretsky, Brooklyn, N. Y.

Application May 31, 1950, Serial No. 165,168

3 Claims. (Cl. 154—42)

This invention relates to sealed thermoplastic construction and methods and means for making same. In particular it relates to improved methods, apparatus and products thereof in which one or more sheets or layers of thermoplastic material are provided with treated edges and/or joints.

It is known in the prior art to place thermoplastic material between electrodes which are energized by high frequency alternating electrical current and to cause such material to flow, fuse, or melt by reason of the dissipation of said energy therein. By the simultaneous application of pressure a joint has been obtained but with considerable undesirable deformation and marring of the exposed surfaces of the thermoplastic material. Severance of the welded parts has required a separate cutting operation which is either inaccurate if manually performed or requires additional machinery if performed in a mechanical manner.

It is therefore among the objects of the present invention to provide improved structure, apparatus and methods whereby a joint or edge of superior appearance, uniformity, and strength is obtained accompanied by a reduction in fabricating operations with a consequent reduction in cost.

Another object herein lies in the provision of joint or edge construction for treating one or more sheets of polymerized synthetic resins having a thermoplastic nature, and which are plasticized or unplasticized.

A feature of the invention lies in the fact that edge and joint treatment may be relatively narrow so that a strong physical bond with a smooth and regular appearance is produced at the very edge of the article.

Another object herein lies in the provision of apparatus for heat sealing and edging thermoplastic materials with the use of radio frequency electrical energy wherein sealing and severing operations are performed substantially at the same time and wherein arcing is reduced to a minimum. The reduction in arcing results in longer machine life and a superior product.

Another object herein lies in the provision of methods and means for the electromechanical sealing or edging of thermoplastic materials in which the electrical power is varied during the formation of the edge or joint and in correlation to variations in inter-electrode spacing.

Another object herein lies in the provision of methods and means for maintaining a relatively constant high frequency electromechanical potential gradient during the sealing or edging operation.

A still further object lies in the provision of useful articles, composed of thermoplastic material, having an improved edge, or improved joints, or both.

These objects and features, and other incidental ends and advantages, will become more fully apparent during the course of the following disclosure, and be pointed out in the appended claims.

In the drawings similar reference characters designate corresponding parts throughout the several views.

Figure 1 is a schematic view showing an embodiment of the invention.

Figure 2 is an enlarged fragmentary view of a portion of Figure 1 showing a later stage in operation.

Figure 3 is a sectional view, partly in elevation corresponding to Figure 2 and showing an alternate form of pressing and fusing element.

Figure 4 is a schematic diagram for the apparatus shown in Figure 1.

Figure 4a is an enlarged fragmentary sectional view of an edge joint in accordance with the present invention.

Figure 5 is a fragmentary view in perspective of two sheets with an edge seam of the type which is improved by the present invention. Fig. 5a is a section.

Figure 6 is a fragmentary view in perspective of two sheets with a seam formed away from the edges of both sheets, which is improved by the present invention. Fig. 6a is a section.

Figure 7 is a fragmentary view in perspective of two sheets with a seam formed at the edge of one sheet and spaced from the edge of the other sheet, which is improved by the present invention. Fig. 7a is a section.

Figure 8 is a view corresponding to Figure 5 in which one of the sheets is shorter in the direction of the seam line. Fig. 8a is a section.

Figure 9 is a view corresponding to Figure 5 partly opened. Fig. 9a is a section.

Figure 10 is a view corresponding to Figure 8 partly opened. Fig. 10a is a section.

Figure 11 is a fragmentary view in perspective showing a seam including the present improvements. Fig. 11a is a section.

Figure 12 is a front elevational view of Figure 11.

Figure 13 is similar to Figure 11 with only the front sheet provided with a curved edge at the longitudinal termination of the seam. Fig. 13a is a section.

Figure 14 is a front elevational view of Figure 13.

Figure 15 is a view in perspective of two sheets, an edge seam forming a pocket of the type improved by the present invention. Fig. 15a is a section.

Figure 16 is a view in perspective similar to Figure 15, but incorporating the present invention. Fig. 16a is a section.

Figure 17 is a view corresponding to Figure 16 showing a modification thereof. Fig. 17a is a section.

Figure 18 is a view corresponding to Figure 17 showing a modification thereof. Fig. 18a is a section.

In accordance with the invention, an apparatus generally indicated by reference character 20 comprises broadly a base 21, a layer of insulating material 22 on said base; a pressing, fusing and severing element 23, a ram 24, and means 25 to apply heat to the fusible material 26.

The base 21 may be the bolster of a press of which the ram 24 may be actuated by mechanical or fluid pressure as by a well known air (or hydraulic) cylinder 27. The base 21 is connected by the conductor 28 to the high frequency electrical generator 29, while the other side of said generator is connected through the conductors 30 and 31 to the element 23, with the capacitor 32 in series. The element 23 is electrically isolated from the ram 24 by an insulator 33 which also serves to actuate the switch 36 which activates the H. F. generator at a predetermined position of the element 23.

The generator 29 may be any suitable source of high frequency electricity. We have found that the frequency may range between 10 megacycles and 300 megacycles per second. The power depends upon the area and mass of the material 26 being treated and should be at least sufficient to raise said material to its fusing temperature, as for example in the case of vinyl plastic sheets to 140° F. The generator 29 may contain a timer for turning the high frequency power on and off for a predetermined period, usually between one-half to ten seconds. The generator desirably includes adjustment means 37 to control the voltage thereof.

The pressing, fusing and severing element 23 includes a cutting edge 34 and an angular face 35. The element 23, at least at the active edge and face thereof is electrically conductive. The angle of the face 35 is preferably of 45 degrees with respect to the axis of said element, but may have a substantial range. When too acute insufficient welding takes place, while too obtuse an angle increases the power required and reduces the severing action of the edge 34.

The layer of insulating material 22 preferably has high dielectric strength, a low power factor, and the ability to withstand heat and pressure without deformation, as for example, mica, and glass.

The capacitor 32 is preferably a variable air-dielectric capacitor and is used for adjusting or controlling the high frequency potential between the element 23 and the base 21. It is supplementary to the power adjustment means 37.

The switch 36 is of the precision type to turn on the generator 29 when the element 23 engages the material 26, to reduce arcing to a minimum.

While we have shown the material 26 as two layers 39 and 40 a single ply or a greater number may be treated. A single ply receives a cut and smooth edge while more plies are seamed or joined and smoothened (Figure 4a).

As presently understood one method and mode of operation is as follows: The control 37 is adjusted so that at the end point described below, arcing does not occur between the element 23 and the base 21. The ram 24 forces element 23 into the sheet plies 39 and 40, the generator 29 being turned on when element 23 is in contact with ply 39. The application of high frequency power to plies 39 and 40 causes their temperature to rise due to the power absorbed by dielectric action. The rise in temperature softens the thermoplastic or fusible material and thus allows the edge 34 to penetrate. At the same time, the softened surfaces of plies 39 and 40 juxtaposed to the face 35 intermix, which upon cooling, form a strong physical weld or bond. The end point is reached when the edge 34 passes entirely through plies 39 and 40 and touches the insulating material 22; or when the edge 34 passes through ply 39 and nearly through ply 40 (see Figure 2).

That portion of the material 26 whose edges are to be joinned is indicated as portion 42 while portion 41 may be considered as waste. A variation is to have element 23 beveled in opposite directions, that is on both edges, so that portions 41 and 42 would have joined edges as set forth herein. The basic edge is, however, produced on portion 42 where one face 35 is used.

When the element 23 is withdrawn, or elevated as seen in Figures 1 and 2, unless the ply 40 is completely severed, a very thin web of the material at the bottom of ply 40 joins portion 41 and portion 42. With proper adjustment of the frequency and voltage output of generator 29, the duration of power application, the setting of capacitor 32, and the pressure of the ram 24, the web or layer is a minimum in thickness. This permits separation of portions 41 and 42 by tearing or cutting while leaving a smooth parting edge line.

It has been found that the angle of the cutting edge 34 has an effect on the seam or joint 50. The smaller the angle of the face 35, the less power and mechanical pressure required. The width of the seam or joint 40, and hence its strength and resistance to parting is reduced. As the angle of the face 35 increases toward a right angle, more high frequency power and greater mechanical pressure is required, but the width of the joint 50 is increased. When still more mechanical strength of the bond is required it can be produced by the structure shown in Figure 3. To avoid repetition parts here are given the same reference characters as previously described with the addition of the prefix "1." The second face 119 forming a more obtuse angle with respect to element 123 produces a wider seam or joint 150. Section 141 may be discarded.

While the pressing and fusing element 23 produces the desirable edge with the smooth bevel 51, the cutting edge 34 increases the likelihood of destructive arcing.

For example, with the layers 39 and 40 being sheets of vinyl plastic between .004" and .020" thick, approximately 5,000 volts at 50 megacycles is initially required. As the cutting edge 34 approaches the base 21, therefore, the insulation thickness and effectiveness decreases, increasing the likelihood of arcing which damages the cutting edge 34. This tendency for an arc to jump can be minimized in the following manner. Assume that two vinyl plastic sheets .010" thick are to be joined. Therefore, the required high frequency potential gradient in the plastic is 250 volts/mil. When this gradient is maintained as the edge 34 passes through plies 39 and 40, then when the edge 34 is .001" from the bottom of ply 40, the voltage across the unpenetrated portion of ply 40 is 250 volts instead of 5,000 volts. This reduces the tendency toward arcing.

Turning to Figure 4, the capacity formed by the unpenetrated fusible material as the dielectric is represented by $32a$ which is in series with capacitor 32. The distributed shunt capacity of the press is represented by $32b$.

In view of the fact that the most desirable practice of the invention is accomplished when the inter-electrode voltage decreases in direct proportion to the decrease in its inter-electrode spacing and approaches zero, we have found that the most desirable operation is obtained when the capacity such as the capacity $32b$ other than that between the said electrodes is kept at a minimum. For this purpose therefore we have found that the most satisfactory operation and results are obtained when the platens of the press are composed of non-conducting material or at least one of them, as for example the insulator 33 and the electrical energy is conducted to the fusing and severing element 23 by a conductor such as the conductor 31 presenting a relatively small area in juxtaposition to the platen as for example the base 21 which is energized over a greater area.

Assuming, for example, that the high frequency potential $(E-1)$ of the source or generator 29 across the conductors 28 and 30 remains constant. Then the voltage E across the capacity $32a$ $(C-1)$ is, where J is the capacity of 32:

$$E = \frac{J \times (E-1)}{(C-1)+J}$$

As the cutting edge 34 penetrates into the fusible dielectric material being treated, the capacity of the capacitor formed thereby, increases. From the above equation, it will be noted that as $C-1$ increases, E, the voltage across the material 26 decreases. This relationship can be made more linear as the capacity J of the capacitor 32 is decreased. However, reducing the capacity J raises the practical difficulty of requiring higher high frequency potential from generator 29. A practical compromise can be reached whereby when J (32) is set between 1 and 50 micromicrofarads, depending upon the area of the joint or seal, the potential gradient across the unpenetrated material 26 is held approximately constant.

The foregoing apparatus and methods may be applied in the production of seams and joints having increased physical resistance to separation and at the termination of the seam or joint.

This juncture of a plurality of thermoplastic sheets (polyvinyl copolymer or similar) is applicable to a number of seam locations relative to the edge of the sheets parallel to the seam as seen in Figures 5, 6 and 7. While the following description is, by way of example applied to the type of seam of Figure 5 with two sheets or plies, it is to be understood that the same may be used with a greater number of plies and to the forms of Figures 6 and 7.

There are two types of longitudinal termination of a seam. Figure 5 shows a seam terminating longitudinally at the edge of both sheets simultaneously while Figure 8 shows a seam terminating longitudinally at the edge of one sheet while the other sheet extends beyond the seam.

When a relative force F is applied to both sheets for either type of longitudinal termination in the general direction shown in Figures 5 and 8, the seams open for a comparatively small force, see Figures 9 and 10 respectively.

In accordance with the present invention the force required to open the seams is increased. In Figure 11, the sheet 61 and the sheet 62 are welded at the seam 63. The upper or end edges 63 and 64 of the sheets 61 and 62 respectively are of angular and curved configuration so as to have angular edges 65 and 66 and curved portions 67 and 68. This construction greatly increases the resistance to rupture of the seam. The force required for rupture is increased because, it is believed, said force instead of being concentrated at the edge of the seam such as the seam edge 70 in Figure 5, is distributed over a much greater area so that the effective force per unit area is decreased. We have found that the angle of the cut, at 65 and 66 should be substantially from 5° to 50° for best results. In addition to distributing the separating forces over a larger area of seam, this type of construction does not allow for a purchase to be obtained at the very end edge of the seam (as at 70).

Figures 13 and 14 are similar but show only the sheet 162 as provided with the configuration. This relates generally to Figure 8 and parts have same reference characters as in Figures 11 and 12 with prefix "1" added.

Figure 15 shows the construction of a typical pouch formed by sealing three sides of two juxtaposed sheets. The end edges of the seams at 70 and 71 may be opened or broken by applying a relatively small force F—F in the direction shown.

In Figure 16, the pouch 72 is constructed by using two ends corresponding to the construction of Figures 11 and 12 and the parts are given corresponding reference characters with the suffixes "a" and "b." The resistance of the seam ends to separation, over those shown in Figure 15 is much greater.

Figure 17 shows a pouch 73 which is a variation in the structure of Figure 16. It has however the addition of the curved edges 74, 75, 76, and 77 which because of the double curvature near the seam terminations distributes the tearing force over greater area and thus provides a stronger construction than that of Figure 16. Here again certain parts are given certain of the reference characters of Figure 16 with the suffixes "c" and "d."

Figure 18 shows a pouch 80 which combines structure of Figures 13, 14 and 17 and shows the type of seam 89 which terminates longitudinally at one sheet 81 and not the other sheet 82. In this figure the sheet 81 has first angular edge portions 83 and 84, second curved edge portions 85 and 86 and third edge portions 87 and 88.

We wish it to be understood that we do not desire to be limited to the exact details of construction shown and described, for obvious modification will occur to a person skilled in the art to which the invention pertains.

We claim:

1. An apparatus for treating a layer or layers of thermoplastic fusible material comprising a base forming a first electrode, a layer of insulating material disposed upon said base, a cutting and forming element providing a second electrode, means for moving said cutting and forming element toward and away from said insulating layer, said insulating layer being adapted to support the thermoplastic layer or layers to be treated, a source of high frequency electrical energy electrically connected between the base and the movable cutting and forming element, a capacitor in series with the high frequency source and the second electrode, and switch means for controlling the operation of the high frequency source responsive to the actuation of the cutting and forming element to turn on the source energy as the cutting and forming element engages the layer or layers being treated.

2. An apparatus for treating a layer or layers of thermoplastic fusible material as defined in claim 1 in which the capacitor is variable.

3. An apparatus for treating a layer or layers of thermoplastic fusible material as defined in claim 1 and said cutting and forming element having two contacting faces, one of said faces running horizontally and the other face depending at an obtuse angle from the one face and terminating at a cutting edge.

References Cited in the file of this patent
UNITED STATES PATENTS

| Number | Name | Date |
|---|---|---|
| 2,233,176 | Melton et al. | Feb. 25, 1941 |
| 2,401,991 | Walton et al. | June 11, 1946 |
| 2,473,143 | Graham et al. | June 13, 1949 |
| 2,510,383 | Dalgleish | June 6, 1950 |
| 2,516,324 | Joy | July 5, 1950 |
| 2,545,328 | Wilson et al. | Mar. 13, 1951 |